United States Patent [19]

Haugen et al.

[11] Patent Number: 5,143,507

[45] Date of Patent: Sep. 1, 1992

[54] WHEEL HANDLING APPARATUS

[75] Inventors: Ronald E. Haugen; David T. Murphy, both of Forest City, Iowa

[73] Assignee: Vix Design Products, Inc., Forest City, Iowa

[21] Appl. No.: 519,581

[22] Filed: May 7, 1990

[51] Int. Cl.⁵ .............................................. B60B 31/06
[52] U.S. Cl. ..................................... 414/427; 269/17; 254/2 B; 279/2.06; 294/93
[58] Field of Search ............... 414/426, 427, 618, 619, 414/620, 908, 463, 464, 465, 466; 254/2 R, 2 B; 29/273, 414, 252; 269/17, 27, 47, 49, 50, 17; 224/42, 24, 42.12; 294/93, 88; 279/1 L, 16, 27, 47, 49

[56] References Cited

U.S. PATENT DOCUMENTS

| | | |
|---|---|---|
| 1,254,797 | 1/1918 | Gries . |
| 1,731,204 | 10/1929 | Recchia . |
| 2,952,295 | 9/1960 | Marinovich et al. . |
| 3,022,551 | 2/1962 | Marburg . |
| 3,301,419 | 1/1967 | Molden et al. . |
| 3,491,427 | 1/1970 | Zimmerman et al. .......... 414/426 X |
| 3,501,037 | 3/1970 | Donovan ............................ 414/427 |
| 3,647,183 | 3/1972 | Rishovd ........................... 254/2 B |
| 3,685,125 | 8/1972 | DePierre ........................ 414/427 X |
| 3,715,040 | 2/1973 | Polus et al. ..................... 414/277 X |
| 4,022,341 | 5/1977 | Lindquist . |
| 4,042,139 | 8/1977 | Pemsteiner et al. ................. 414/427 |
| 4,123,038 | 10/1978 | Meyers . |
| 4,277,875 | 7/1981 | Worrell . |
| 4,504,179 | 3/1985 | Nicolin ........................... 279/2 A X |
| 4,571,142 | 2/1986 | Niewald et al. . |
| 4,629,388 | 12/1986 | Riemer et al. ....................... 414/427 |
| 4,684,310 | 8/1987 | Stange . |
| 4,930,966 | 6/1990 | Chien .................................. 414/427 |

FOREIGN PATENT DOCUMENTS

| | | |
|---|---|---|
| 930973 | 7/1955 | Fed. Rep. of Germany ...... 414/466 |
| 3113048 | 2/1982 | Fed. Rep. of Germany ...... 254/2 B |
| 69072 | 6/1977 | Japan ................................ 414/426 |
| 709504 | 2/1978 | U.S.S.R. . |
| 1119977 | 10/1984 | U.S.S.R. ............................... 414/620 |

*Primary Examiner*—Frank E. Werner
*Attorney, Agent, or Firm*—Burd, Bartz & Gutenkauf

[57] ABSTRACT

A wheel handling apparatus has an upright frame movably supporting a carrier connected to a wheel holder and a power unit for operating the wheel holder. A winch mounted on the carrier is used to move the carrier along the frame. The wheel holder has a body rotatably mounted on the carrier and a cone head connected to the power unit. The body supports arms that are moved into engagement with a wheel when the head is moved by the power unit into the body.

30 Claims, 11 Drawing Sheets

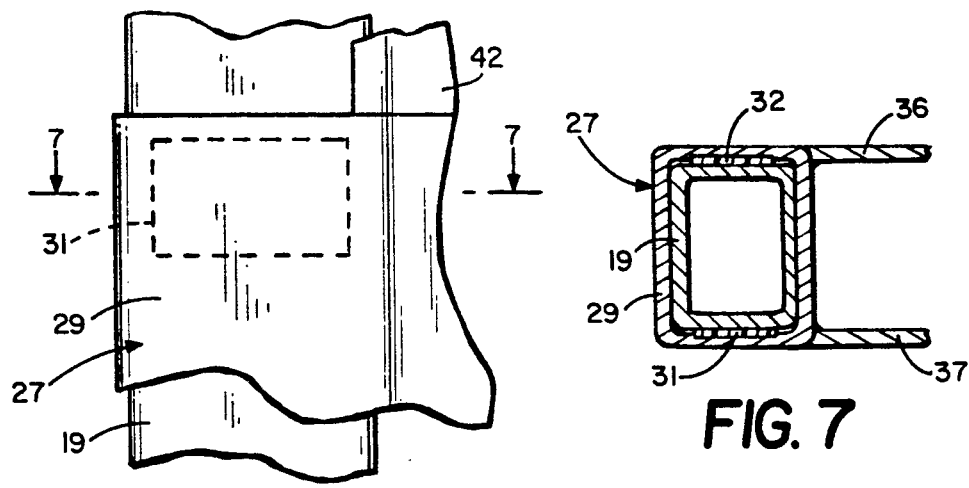
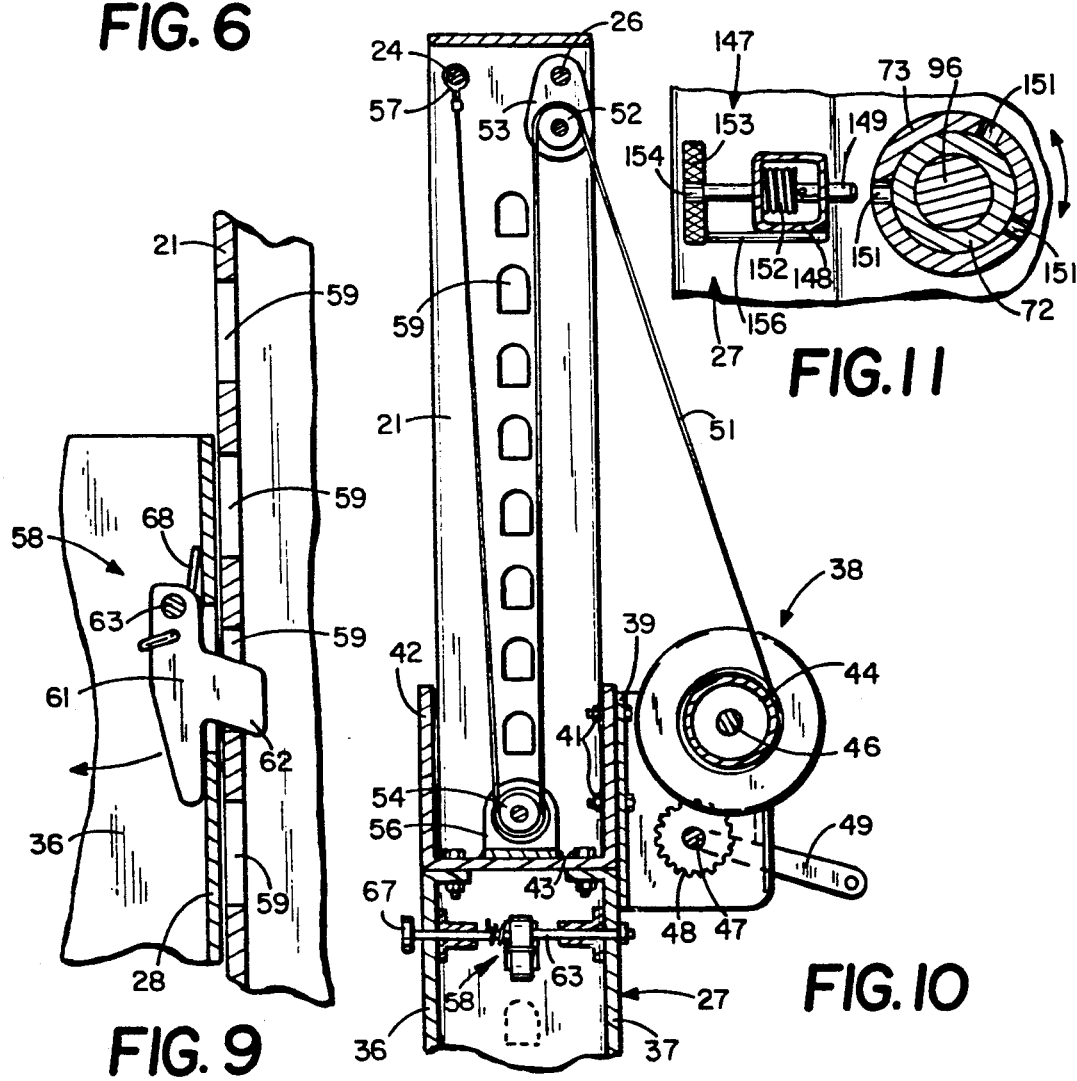
FIG. 6
FIG. 7
FIG. 11
FIG. 9
FIG. 10

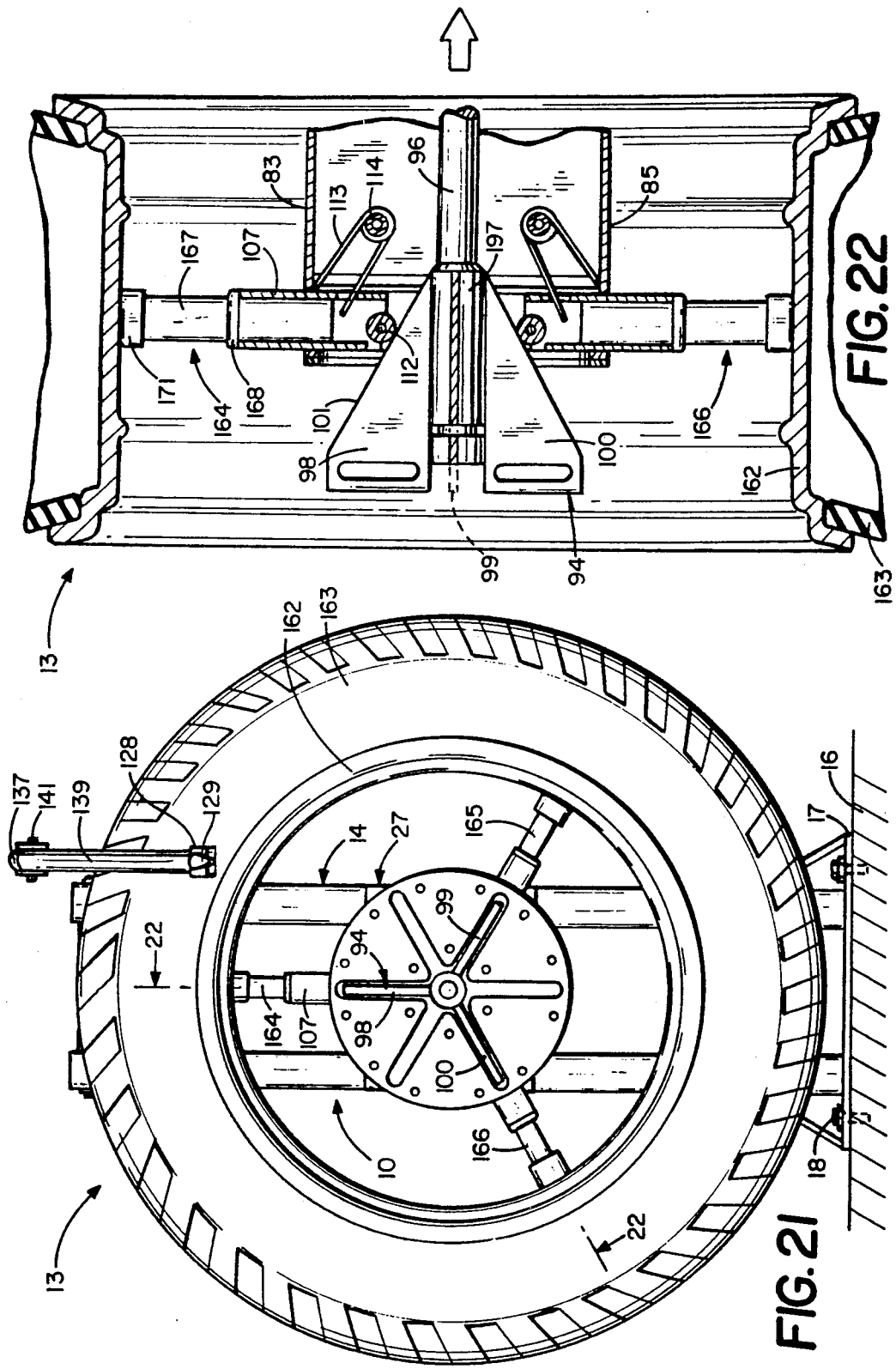

WHEEL HANDLING APPARATUS

FIELD OF INVENTION

The invention is directed to wheel lifts for supporting a large wheel having a pnumatic tire.

BACKGROUND OF THE INVENTION

The wheel handling apparatus of the invention is an improvement of the wheel manipulator disclosed by Charles E. Strange in U.S. Pat. No. 4,684,310. This wheel manipulator has a carriage that is vertically adjustable relative to an upright frame. A wheel holding structure is mounted on the carriage to secure a wheel to the carriage. A winch mounted on the frame is used to elevate the carriage and wheel holding structure above a support surface. The wheel holding structure is mounted on a turret that allows the wheel to be rotated by the workperson and locked in a selected rotated position. The turret has a plate used to connect the wheel to the turret. Nut and bolts are be used to directly connect the hub of a wheel to the plate. On larger wheels extension arms and nut and bolt assemblies are used to connect the wheels to the plate. This type of mounting structure for the wheel on the plate requires considerable labor and time and is not adaptable to all types of wheels.

SUMMARY OF INVENTION

The invention relates to an apparatus for handling relatively large and heavy wheels commonly used on trucks tractors and land vehicles. These wheels have rims supporting pneumatic tires. Periodically the tires must be inspected and repaired. Each wheel is removed from the vehicle and positioned in a location that allows a workperson to separate a bead from the rim and inspect the tire and perform necessary repair work. The apparatus of the invention supports the wheel in a fixed position to allow the workperson to conveniently work on the tire. The apparatus secures the wheel on a wheel holder. The wheel holder along with the wheel is then elevated and rotated to locate the desired portion of the tire in a convenient location accessable to the workperson. One bead of the tire is removed from the rim. A bead spreader, such as disclosed by Ronald E. Haugen and David T. Murphy in U.S. patent application Ser. No. 454,034, now U.S. Pat. No. 5,044,607, is used to spread and hold the tire in an open position to allow the workperson to inspect and repair the tire. The apparatus includes an air operated power unit which does not have any electrical circuits thereby eliminating electrical shock. Relatively large tires can be handled with the wheel handling apparatus by a single workperson in an effective and efficient manner. The apparatus has a wheel holder that is versatile in use in that it accommodates different types and sizes of wheels without a major alterations to its structure.

The wheel handling apparatus has the generally upright mast mounted on a support, such as the floor. A carriage assembly is slideably mounted on the mast for movement in the vertical direction along the mast. A winch connected to the carriage assembly operates to move the carriage assembly to selected positions along the mast. A releasable latch is operable to hold the carrier in a selected position. The latch can be released to allow the carrier assembly to move downwardly relative to the mast. A wheel holder is mounted to the carrier assembly for holding a wheel. A power unit is also mounted on the carrier assembly. The power unit is connected to the wheel holder and operates to actuate the wheel holder to hold the wheel in a selected position. The wheel holder can be rotated so that a portion of the tire on the wheel can be placed in a position where it is readily accessible by a workperson. The workperson removes a bead from the tire. A tire spreader is then used to spread the bead from the rim to provide convenient access into the interior of the tire. A releasable lock is used to hold the wheel holder in a selected annular position.

The preferred embodiment of the invention has a wheel holder having a body connected to a rod rotatably mounted on the carrier assembly. The rod is connected to the power unit which comprises a double acting air cylinder operable to longitudinally move the rod relative to the body. The body has a plurality of housings accommodating outwardly movable arms. The arms are moved in an outward direction into engagement with the rim of a wheel to hold the wheel on the wheel holder. The outer end of the rod is connected to a head having a plurality of outwardly directed fins. Each fin has an inwardly converging edge that is engagable with an arm to move the arm in an outward direction when the head is moved into the housings by the power unit. The fins on the head also function to hold a hub of a smaller tire into engagement with the body.

Further advantages of the wheel handling apparatus of the invention are embodied in the following detailed description in conjunction with the accompanying drawing.

DESCRIPTION OF DRAWING

FIG. 6 is an enlarged elevational view of a corner of the carriage as viewed in FIG. 3;

FIG. 7 is a sectional view taken along the line 7—7 of FIG. 6;

FIG. 9 is an enlarged sectional view taken along the line 9—9 of FIG. 8;

FIG. 10 is an enlarged sectional view taken along the line 10—10 of FIG. 3;

FIG. 11 is an enlarged sectional view taken along the line 11—11 of FIG. 1;

FIG. 21 is a front elevational view of the wheel handling apparatus support in a large third wheel;

FIG. 22 is an enlarged sectional view taken along the line 22—22 of FIG. 21.

DESCRIPTION OF PREFERRED EMBODIMENT

The wheel handling apparatus indicated generally at 10 shown in FIGS. 1, 17, 19 and 21 is operable to lift different types of wheels 11, 12 and 13. The wheels are used on road and off-the-road vehicles, such as trucks, trailers, tractors, and industrial and agricultural machines. Other types of wheels can be handled with apparatus 10. The wheels have rims supporting rubber tires inflated with air under pressure. These wheels are relatively large and heavy so that they cannot be manually handled. The apparatus 10 secures a wheel in the generally vertical position and elevates the wheel above a support surface such as the floor or ground 16 to allow a work person to separate the bead from a rim for servicing a tire. The wheel can be rotated in the raised position to permit service to different sections of the tire.

Figure 1:
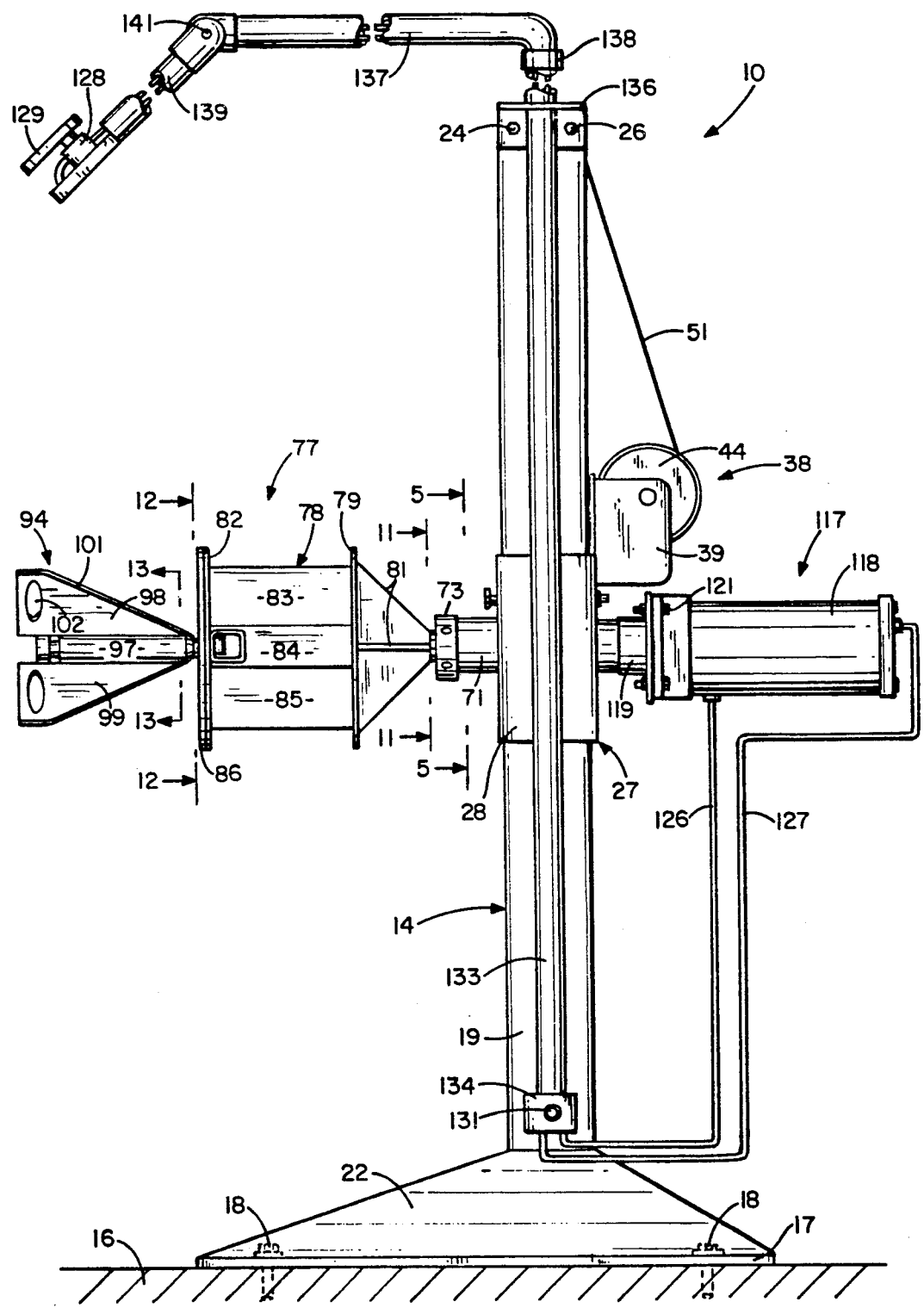
FIG. 1 is a side elevational view of the wheel handling apparatus of the invention.
Figure 2:
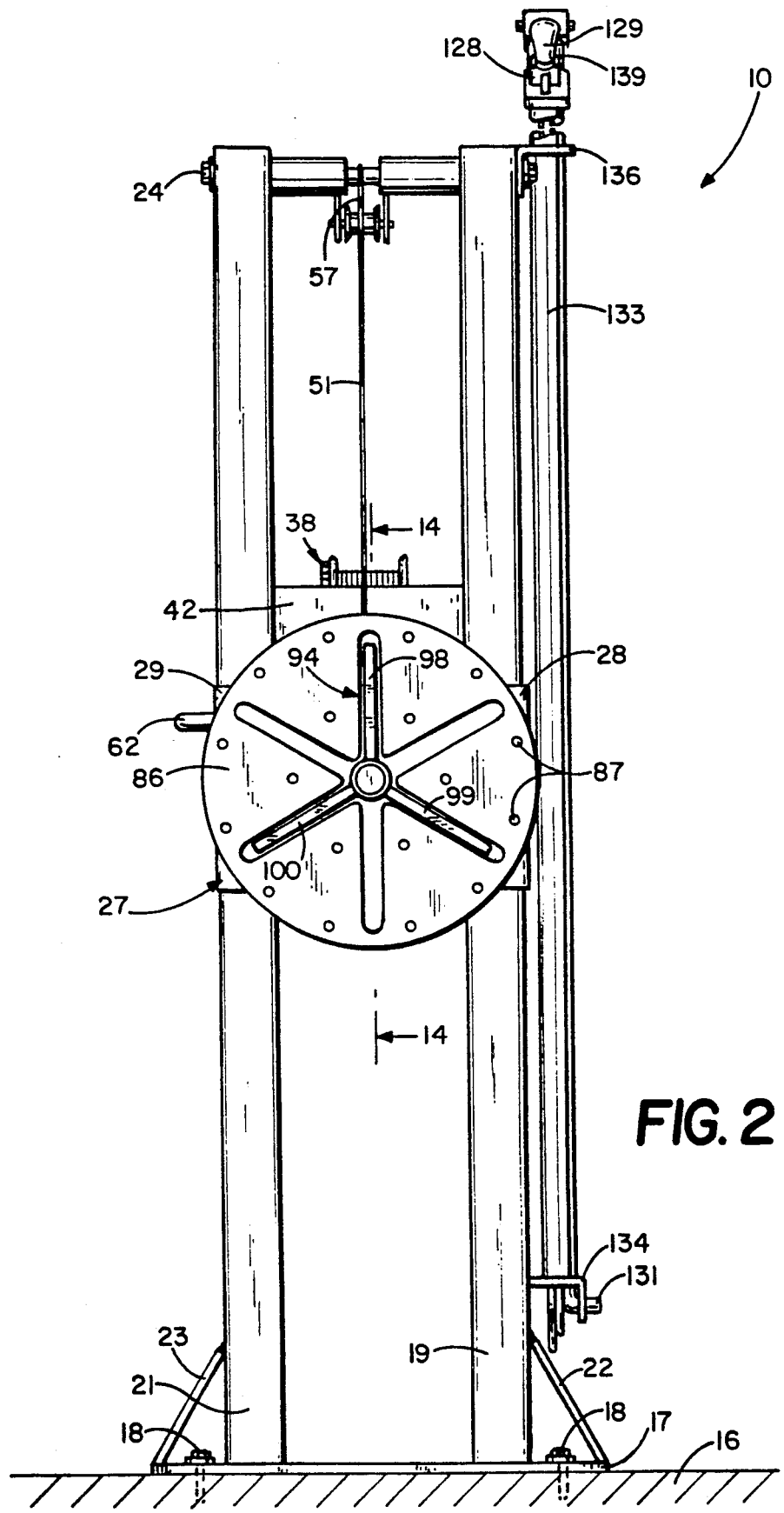
FIG. 2 is a front elevational view of the wheel handling apparatus of FIG. 1.
Figures 3, 4, 5:
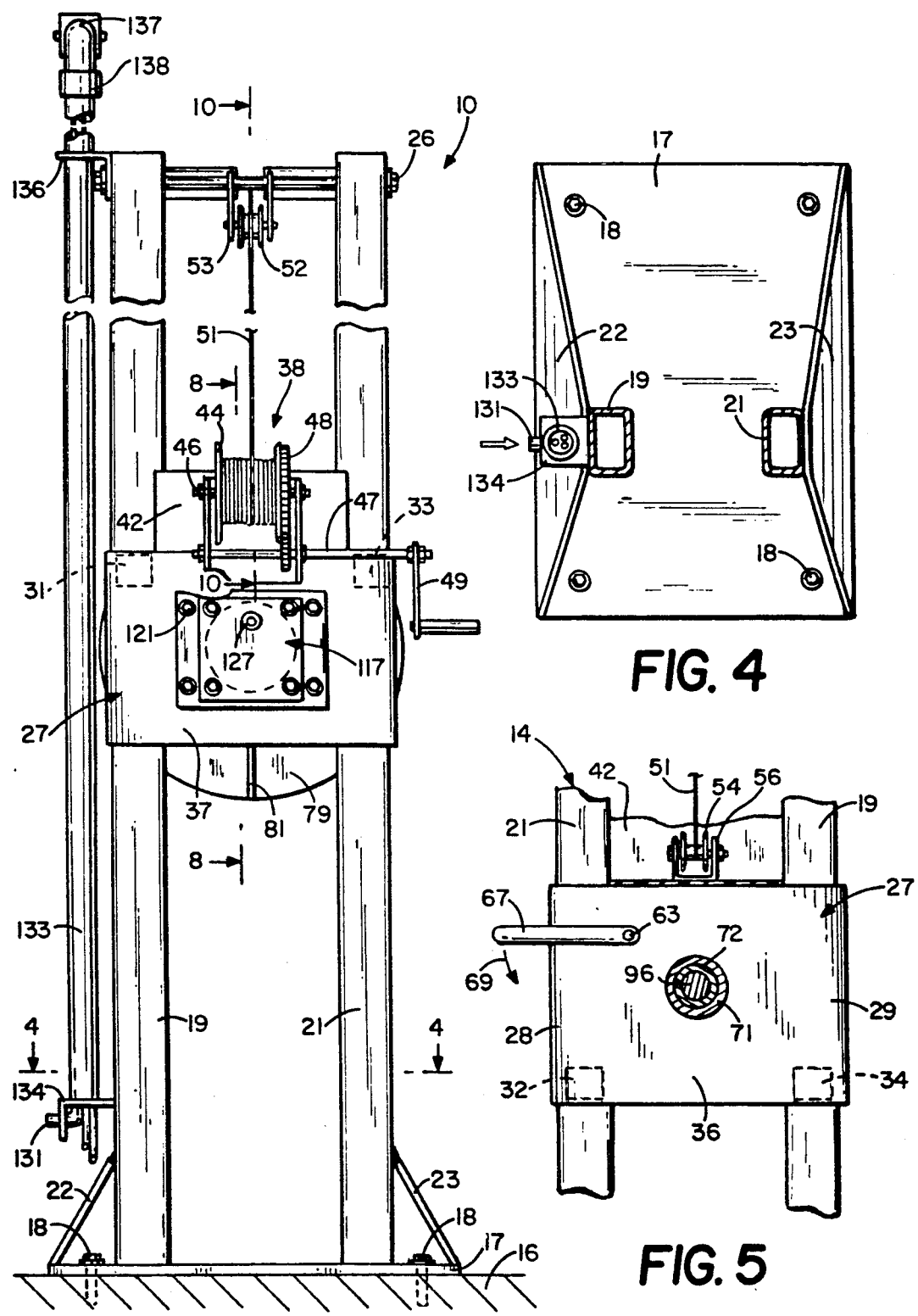
FIG. 3 is a foreshortened rear elevational view of the wheel handling apparatus of FIG. 1.
FIG. 4 is a sectional view taken along the line 4—4 of FIG. 3.
FIG. 5 is a sectional view taken along the line 5—5 of FIG. 1.

As shown in FIGS. 1, 2 and 3, wheel handling apparatus 10 has frame comprising an upright mast indicated generally at 14 secured to a support 16 such as the floor. Mast 14 has a generally flat base plate 17 attached with connectors 18, such as bolts to floor 16. A pair of upright box beams or members 19 and 21 are secured to plate 17. Beams 19 and 21 are laterally spaced from each other and extend upwardly from plate 17. As shown in FIGS. 2 and 3, beams 19 and 21 are generally parallel to each other. Gusset plates 22 and 23 also secure the lower ends of beams 19 and 21 to opposite sides of base plate 17. The upper ends of beams 19 and 21 are connected with a pair of bolts 24 and 26.

A carrier assembly indicated generally at 27 is mounted on beams 19 and 21 for up and down movements along the length of beams 19 and 21 to selectively raise and lower a wheel and hold the wheel in a selected position as herein described. Carrier assembly 27 has upright box shaped tubular members 28 and 29 that are located about beams 19 and 21. Members 28 and 29 have a close sliding relationship relative to the walls of beams 19 and 21 so that carrier assembly 27 tracks along the beams. First bearing slides 31 and 32, as seen in FIG. 7, slideably support tubular member 29 on beam 19. Second bearing slides 33 and 34, shown in FIGS. 3 and 5, slideably support tubular member 28 on beam 21. The bearing slides 31-34 are generally flat plastic bearing members such as high density polyethelene pads. Other types of bearings and low friction pads can be used to slidably support carrier assembly 27 on beams 19 and 21. Tubular members 28 and 29 are laterally spaced from each other and connected with a front plate 36 and a back plate 37 to complete the carrier assembly.

The position of carrier assembly 27 on mast 14 is controlled with a lift apparatus, such as a winch indicated generally at 38. As seen in FIG. 10, winch 38 has a U-shaped frame 39 secured with a plurality of bolts 41 to a channel member 42 attached with bolts 43 to front and back plates 36 and 37. Channel member 42 extends between beams 19 and 21. Winch 38 has a drum 44 accommodating cable 51. Drum 44 is rotatably mounted on an axle 46 secured to U-shaped frame 39. A rotatable shaft 47 is rotatably mounted on frame 39 below drum 44. A gear train 48 driveably connects shaft 47 and drum 44. As shown in FIGS. 3 and 10, a crank 49 attached to shaft 47 is used to rotate shaft 47 and thereby turn drum 44 to wind cable 51 onto the drum or alternatively allow cable 51 to unwind from drum 44 to selectively raise or lower carrier assembly 27 along beams 19 and 21. Cable 51 extends upwardly from drum 44 over a first pully 52 located below bolt 46. A pair of ears 53 rotatably support pulley 52 on bolt 26. Cable 51, as seen in FIG. 10, extends downwardly from first pulley 52 and under a second pulley 54 located within channel member 42. A bracket 56 secures pulley 54 to the bottom of channel member 42. Pulley 54 is rotatably mounted on bracket 56. Cable 51 extends upwardly from second pully 54 and terminates in a loop 57 anchored on second bolt 24. When crank handle 49 is turned in the clockwise direction cable 51 is wound on drum 44 and thereby moving carrier assembly 27 upwardly along mast 14. Rotation of crank handle 49 in the opposite or counter clockwise direction will unwind cable 51 from drum 44 whereby the weight of carrier assembly 27, wheel holder and power unit mounted thereon cause carrier assembly to move down along mast 14.

Figure 8:
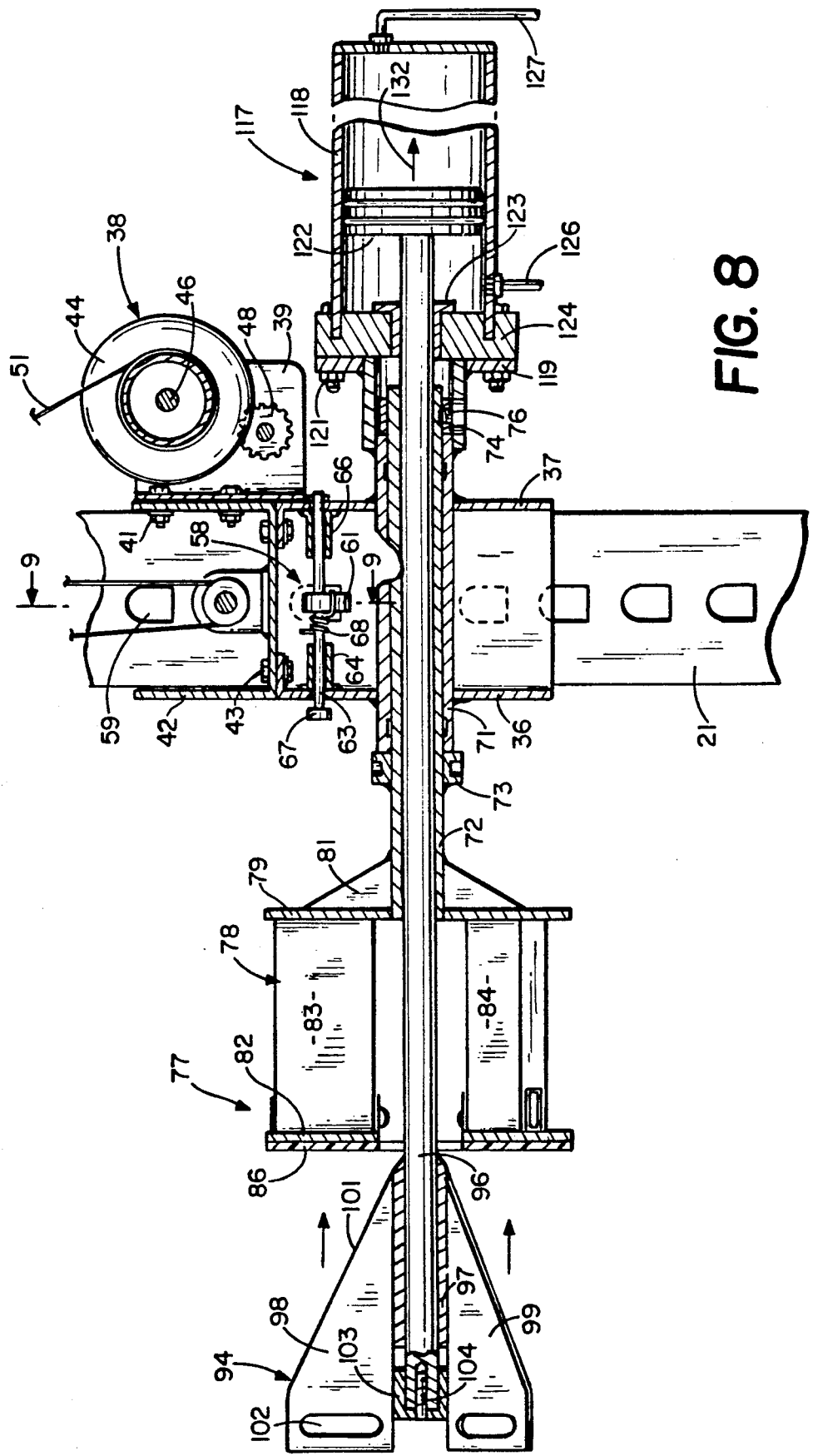
FIG. 8 is an enlarged sectional view taken along the line 8—8 of FIG. 3.

Carrier assembly 27 is held at selected elevations on mast 14 with a releasible latch indicated generally at 58 in FIGS. 8, 9, and 10. Latch 58 cooperates with a plurality of vertically spaced holes 59 in the inside wall of beam 21. Holes 59 extend from adjacent the bottom to the top of beam 21. Latch 58 has a lock plate 61 having an inwardly directed tooth 62 adapted to project through a hole 59 and engage a portion of beam 21 to prevent carrier assembly 27 from moving down. Lock plate 61 is mounted on a transverse rod 63 rotatably supported in a pair of sleeves 64 and 66 secured to the front and back plates 36 and 37, as seen in FIG. 8. The outer end of rod 63 is secured to a lever 67 used to manually turn rod 63 and move tooth 62 out of hole 59 thereby allowing carrier assembly 27 to move down with respect to beams 19 and 21. A spring 68 surrounding rod 63 biases lock member 61 into locking position with beam 21. When lever 67 is moved down as indicated by arrow 69 in FIG. 5 lock plate 61 will swing out of hole 59 against the biasing force of spring 68. Carriage assembly 29 is free to move down along beams 19 and 21. Winch 38 is used to control the lowering of carrier assembly 27 and wheel holder supported thereby. As soon as the force on lever 67 is released spring 68 will bias lock member 61 into locking engagement with beam 21. Tooth 62 is biased back into a hole 59 to the lock position as seen in FIG. 9. Carriage assembly 27 is free to move upward as the angled top of tooth 62 of lock plate 61 allows upward movement of carriage assembly 27. Lock plate 61 is a detent lock that automatically allows upward movement of carrier assembly 27 and prevents downward movement thereof. Lock plate 61 must be released to allow downward movement of carrier assembly 27 and wheel holder and power unit supported thereon as herein described.

As shown in FIG. 8, a horizontal tubular support 71 extends through holes in front and back plates 36 and 37 of carrier assembly 27. Support 71 is located in the central portions of plates 36 and 37 and secured thereto with welds or other fastening means. Support 71 has opposite ends that project outwardly from plates 36 and 37. A tubular member or tube 72 is rotatably mounted on support 71. Tube 72 telescopes through support 71. The outer circumferential surface of tube 72 engages the inner cylindrical surface of support 71 to allow rotation of tube 72 relative to support 71. A pair of collars 73 and 74 mounted on tube 72 engage opposite ends of support 71 to prevent longitudinal movement of tube 72 relative to support 71. Collar 73 is welded to tube 72. Collar 74 is a sleeve secured to tube 72 with a set screw 76.

Figure 12:
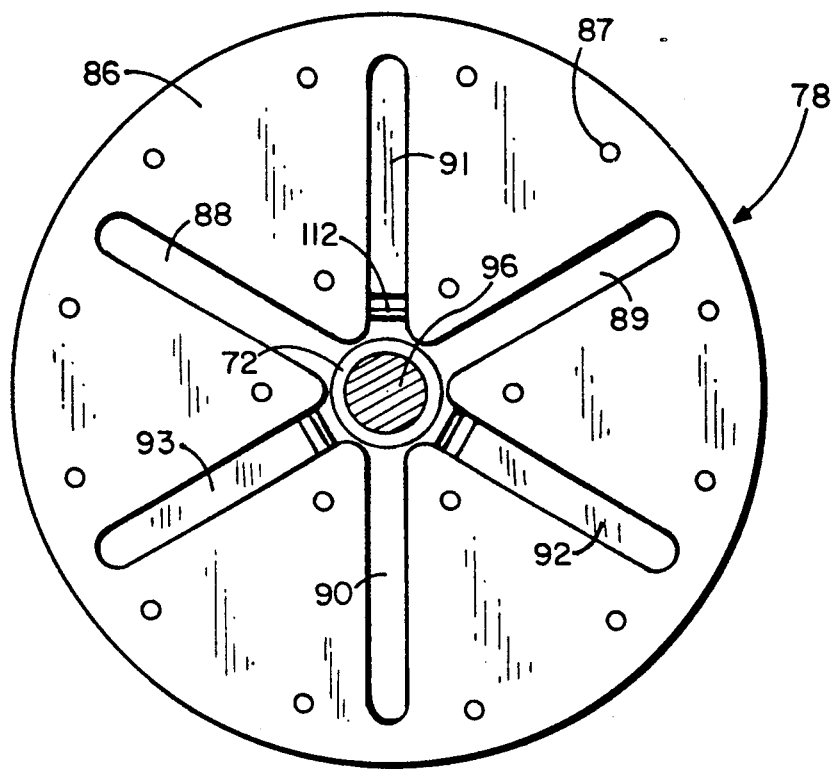
FIG. 12 is an enlarged sectional view taken along the line 12—12 of FIG. 1.
Figure 13:
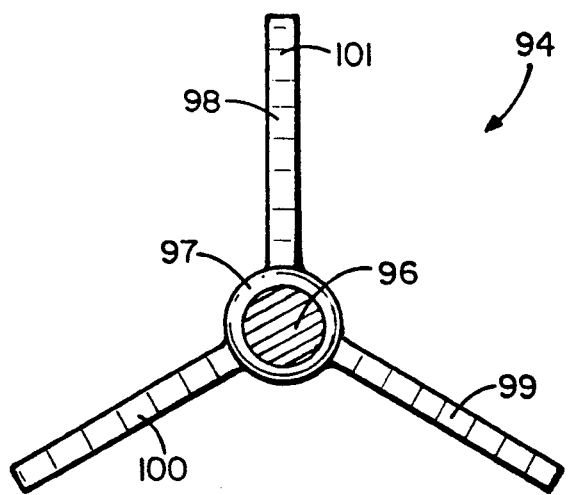
FIG. 13 is an enlarged sectional view taken along the line 13—13 of FIG. 1.

A wheel holder indicated generally at 77 is located adjacent the front of mast 14. Wheel holder 77 has a body indicated generally at 78 secured to the outer end of tubular member 72. Body has a first transverse plate or disk 79 secured with the plurality of gussets 81 to tubular member 72. A second disk 82 located forwardly of the first disk is attached to housings 83, 84 and 85 secured to and extended outwardly from first disk 79. Housings 83-85 are U-shaped structures having side walls on top walls secured to disks 79 and 82. The housings 83-85 are circumferentially spaced from each other approximately 120 degrees. A face place 86 of plastic material is secured to the front side of disk 82 with a plurality of fasteners 87. As seen in FIG. 12, face place 86 and disk 82 have first radial slots 88, 89 and 90 circumferentially spaced from each other about a 120 degrees midway between housings 83-85. Second radial slots 91, 92, and 93 are located between radial slots 88-90 and in alignment with housings 83, 84 and 85. Slots 91-93 provide end openings into housings 83-85.

Figure 14:
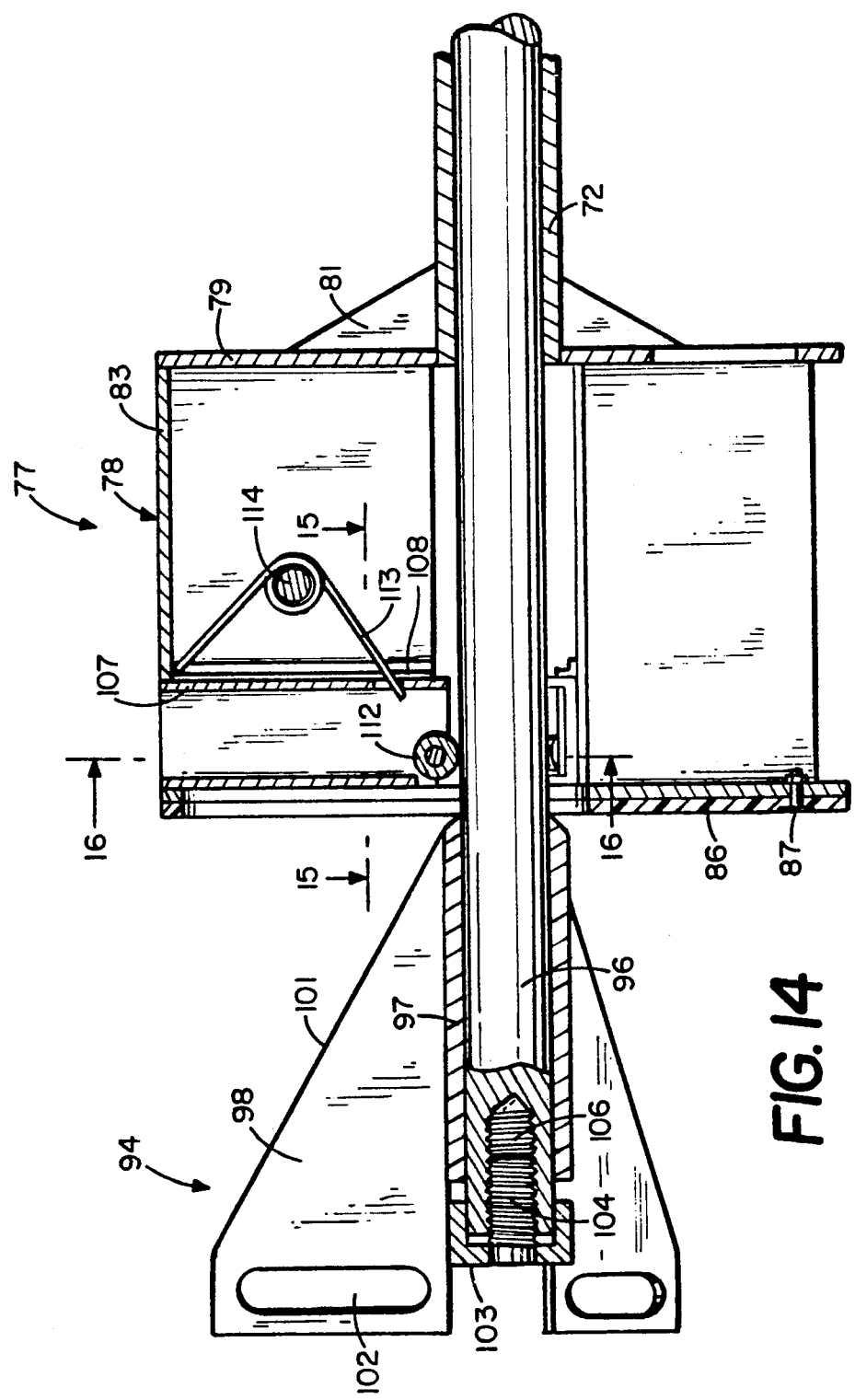
FIG. 14 is an enlarged sectional view taken along the line 14—14 of FIG. 2.

Wheel holder 77 has a cone head 94 in alignment with body 78. Cone head 94 is mounted on an elongaged shaft or rod 96 that extends through tube 73. Head 94 has an elongated sleeve or cone tube 97 that fits over the outer end of rod 76. Plurality of circumferentially spaced generally triangular plates or fins 98, 99 and 100 are secured to tube 97. The fins 98-100 project outwardly in radial directions and are spaced circumferentially around tube 97 with 120 degree angle between adjacent fins. Fins 98-100 are identical in structure. Fin 98 has a forwardly and inwardly inclined front edge 101 that diverges outwardly from the forward tapered end of tube 97. The rear portion of fin 98 has a generally radial slot 102 to accommodate the hand of the operator to handle cone head 94. Fins 99 and 100 have the same inclined front edge and slot. As seen in FIG. 14, a cup shape cap or member 103 fits over the outer end of rod 96. Cap 103 is secured to an inwardly directed bolt 104 that extends into a threaded hole 106 in the outer of shaft 96. The cooperating threads of the bolt and shaft 96 are ACME threads. Cap 103 can be removed from rod 96 to permit removal of head 94 from the rod so a wheel can be located adjacent body 78.

Figure 15:
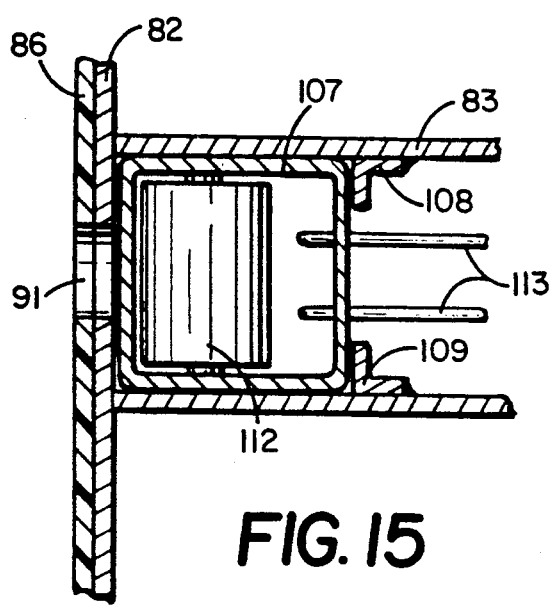
FIG. 15 is an enlarged sectional view taken along the line 15—15 of FIG. 14.
Figure 16:
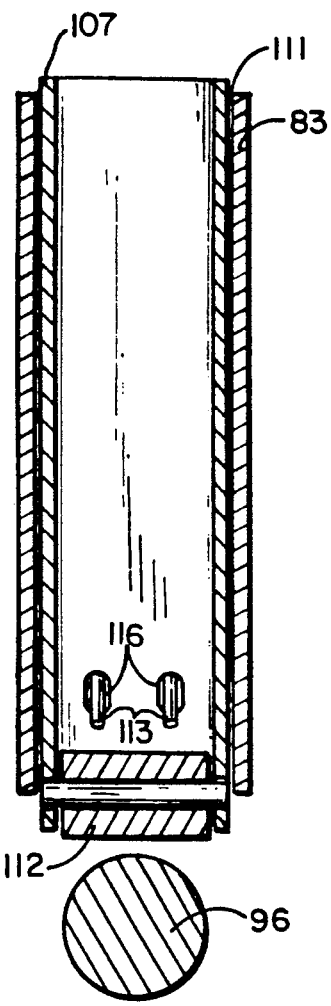
FIG. 16 is an enlarged sectional view taken along the line 16—16 of FIG. 14.

As shown in FIGS. 14, 15 and 16, a radial arm 107 is slideably located in housing 83 adjacent second disk 82. Housing 83 has a top square hole 111 accommodating arm 107. Upright rails or angle members 108 and 109 secured to inside of housing 83 guide arms 107 through hole 111. A roller 112 is rotatably mounted on the lower or inner end of arm 107 adjacent shaft 96. A pair of torsion springs 113 mounted on a pin 114 attached to housing 83 bias arm 107 in an inward direction. Springs 113 have lower ends that project through openings 116 in the lower end of arm 107. Springs 113 also prevent arm 107 from falling out of housing 83. Roller 112 is aligned with slot 91 in disk 82 and rides on the inclined edge 101 when head 94 is moved into housing 83 thereby moving arm 107 in a radial outward direction into holding relation with the rim of a tire as herein after described. Housings 84 and 85 have arms identical to arm 107 that include rollers that are engaged by fins 99 and 100 when cone head 94 is moved into body 78. Springs, such as springs 113, mounted on pins secured to the housings 84 and 85 bias these arms in an inward direction.

As shown in FIG. 8, shaft 96 is linearly moved with an extendable and contractably power unit indicated generally at 117 mounted on the inner end of sleeve 71. Power unit 117 is shown as a piston and cylinder assembly connected to shaft 96. Other types of power units, such as a rotatable lead screw, can be used to linearly move shaft 96 to move cone head 94 between its open and closed positions relative to body 78.

Power unit 117 has a cylinder 118 attached to a collar 119 with a plurality of bolts 121. Collar 119 is secured to the inner end of sleeve 71 with welds or the like. A piston 122 reciprocates within cylinder 118 in response to fluid pressure supplied thereto and vented therefrom. Shaft 96 extends through a sleeve bearing 123 and is connected to piston 122. Sleeve bearing 123 is supported on end member 124. Fluid, such as air under pressure, is supplied to opposite ends of cylinder 118 through lines or hoses 126 and 127. As shown in FIG. 1, hoses 126 and 127 are connected to a four way valve 128 opperable to selectively supply fluid under pressure to and from cylinder 118. Valve 128 has a manually operated actuator 129 that is located in a position generally above the wheel holder 77 that is accessible to the operator of the machine. Air under pressure is supplied to valve 128 with an air supply line 131. When air is supplied to hose 126 piston 122 is moved in the direction of arrow 132 as shown in FIG. 8. This moves cone head 94 into body 78 to place the wheel holder in its closed position. When air is supplied to the opposite end of cylinder 118 the cone head 94 moves away from body 78 to the open position as shown in FIG. 8.

Referring to FIG. 1 an upright pipe or tube 133 is located adjacent the outside of mask beam 19. Tube 133 is supported on a bracket 134 secured to the lower end of beam 19 and a bracket 136 attached to the upper end of beam 19. The length of tube 133 can be shortened to reduce the lengths of air hoses 126 and 127. A horizontal extension 137 is connected to the upper end of tube 133 with a swivel joint 138 which allows extension 137 to swing about a vertical axis so that the operator can change the location of valve 128. A downwardly directed end member 139 is connected to the outer end of extension 137 with a clevis pivot 141. The clevis pivot 141 allows the operator to adjust the angle of the end member 139 and thereby adjust the height of the manually operated valve 128.

Figure 18:
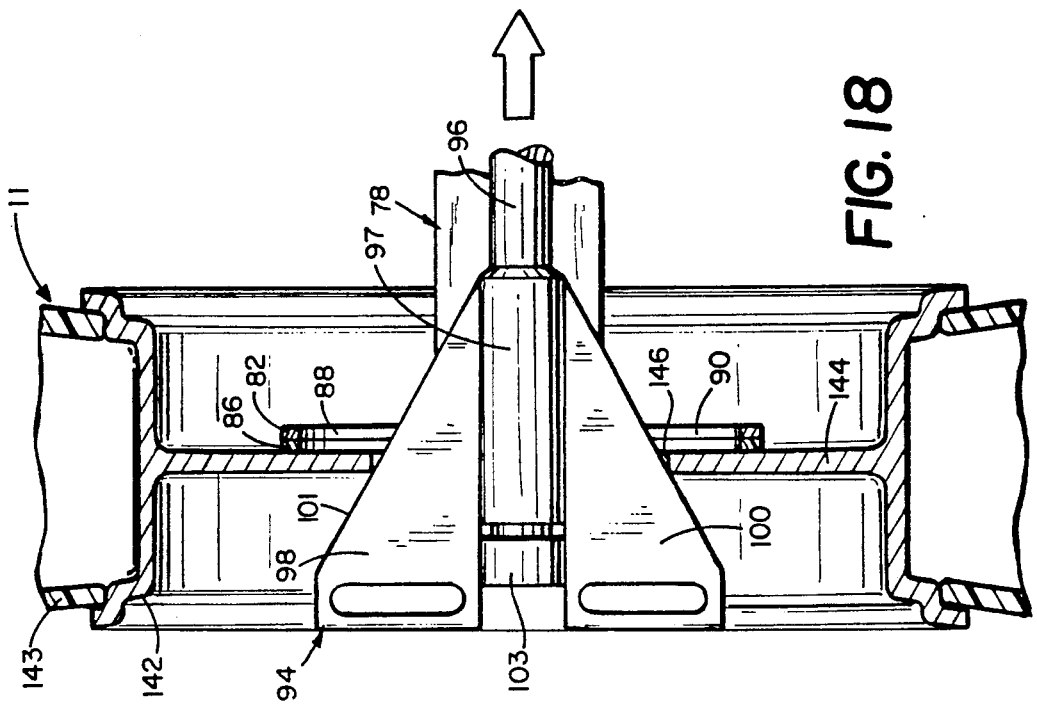
FIG. 18 is an enlarged sectional view taken along the line 18—18 of FIG. 17.

Referring to FIG. 18, there is shown a wheel 11 held in engagement with the face plate 86 of body 78 with cone head 94. Wheel 11 has a rim 142 supporting a pneumatic tire 143. The mid-section of rim 142 is secured to a generally circular hub 144 having a central opening 146. The radial fins 98, 99 and 100 project through the central opening 146 into first slots 88-90 of body 78 and engage the inner wall of the hub 144 that forms opening 146 to mount wheel 11 on cone head 94. Power unit 117 operates to pull shaft 96 in the direction of the arrow to hold cone head 94 in its closed position to clamp hub 144 against face plate 86 of body 78 thereby mounting wheel 11 on wheel holder 77.

Figure 17:
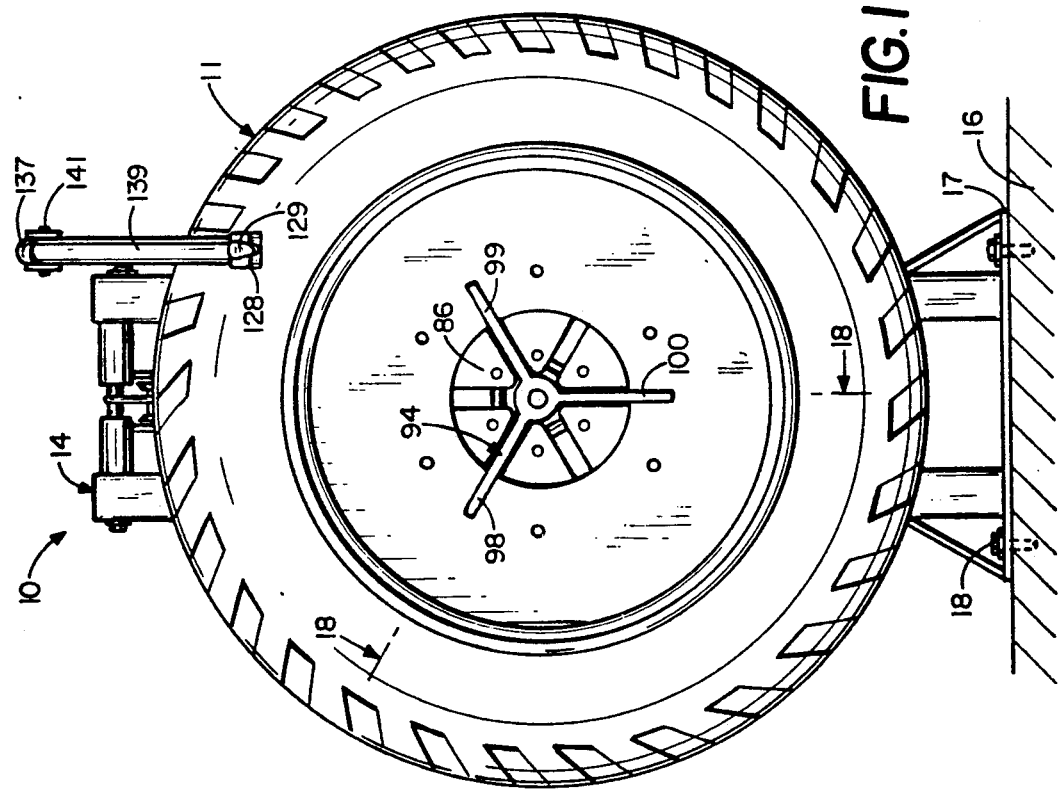
FIG. 17 is a front elevational view showing the wheel handling apparatus supporting a first wheel.

As shown in FIG. 17, when wheel 11 has been elevated above the support surface 16 it can be rotated about its horizontal axis for servicing and repair of a portion of tire 143. A lock unit indicated generally at 147, shown in detail in FIG. 11, is used to hold wheel 11 in a selected angular position. Lock unit 147 cooperates with collar 173 secured to sleeve 72 to wheel holder 77 in a fixed angular position. Collar 73 has a plurality of circumferentially spaced holes 151 that are open to lock unit 147. Lock unit 147 has a support arm 148 accommodating a movable lock pin 149. The forward end of pin 149 is adapted to fit into a hole 151. A spring 152 located within arm 148 biases pin 149 to the lock position. A head 153 is secured to the outer end of pin 149. Head 153 has a radial groove 154. A finger 156 secured to arm 148 engages head 153 to hold the pin 149 in released position. When head 153 is turned so that groove 154 aligns with pin 156 spring 153 biases pin 149 to the lock position with the forward end of pin 149 in hole 151.

Wheel 11 is removed from wheel holder 77 by lowering carrier assembly 27 until wheel 11 engages support 16. Power unit 117 is reversed to move head 94 out of housings 83-85 away from wheel 11. Head 94 is removed from rod 96 by unscrewing cap 103 from rod 96. Wheel 11 is then free to be removed from wheel holder 77.

Figure 20:
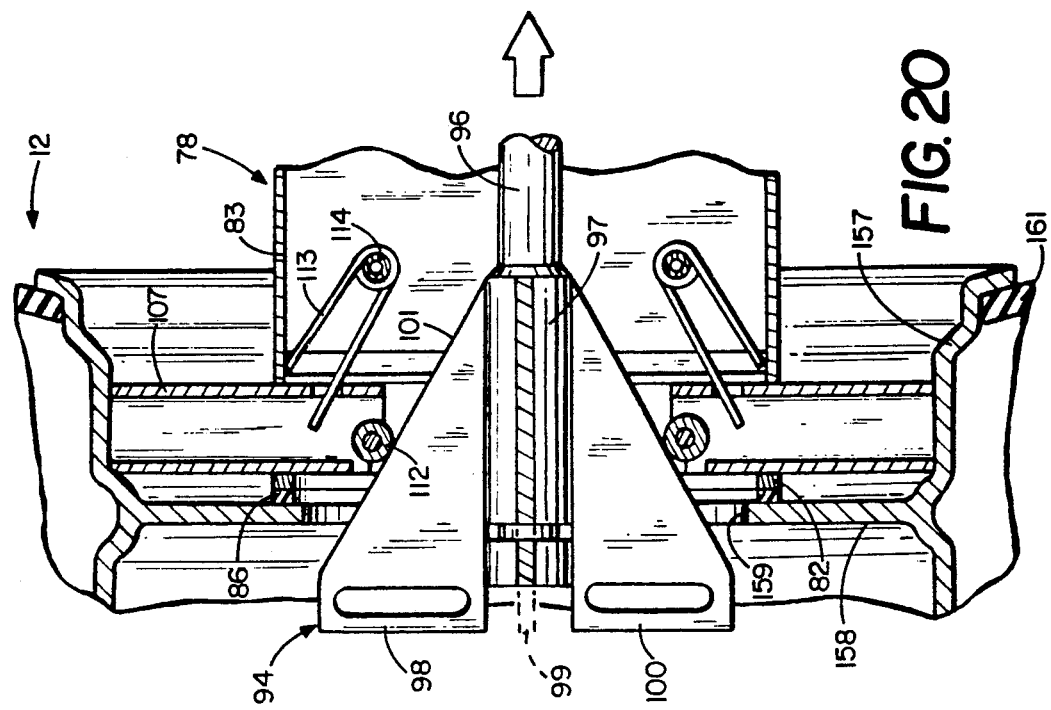
FIG. 20 is an enlarged sectional view taken along the line 20—20 of FIG. 19.
Figure 19:
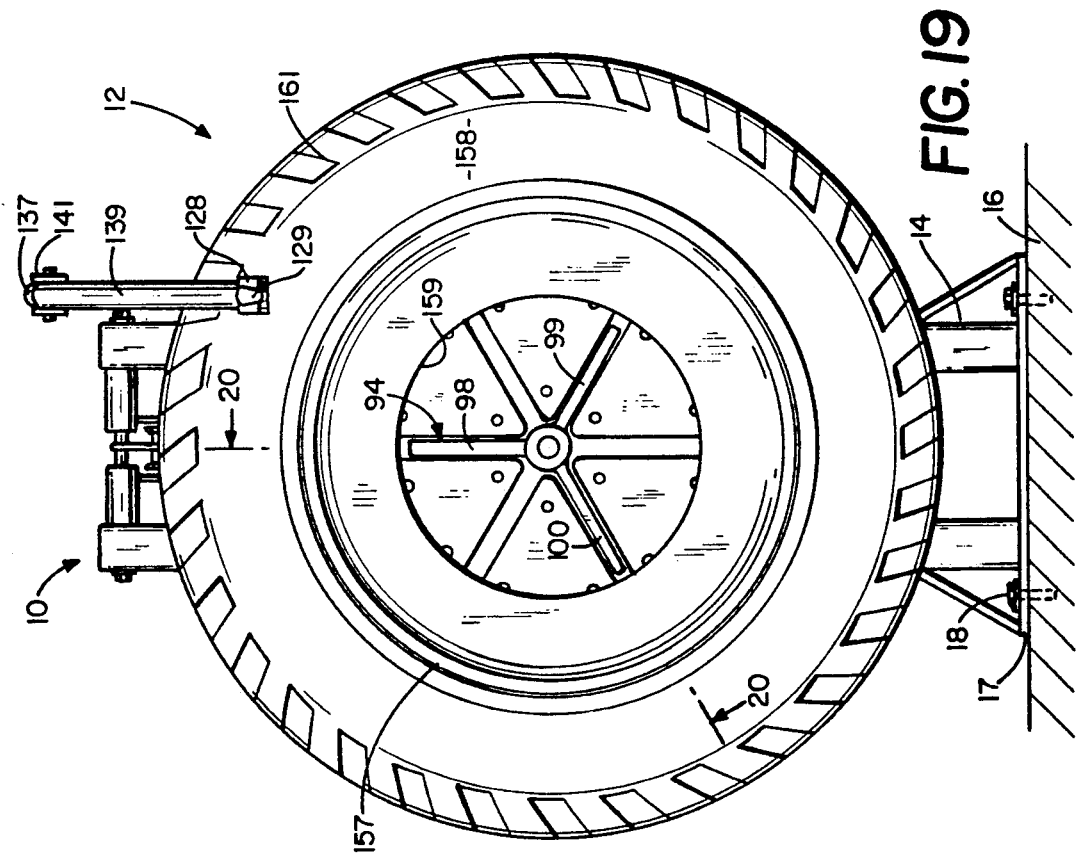
FIG. 19 is a front elevational view showing the wheel handling apparatus of supporting a second wheel.

Referring to FIGS. 19 and 20, there is shown a large wheel indicated generally at 12 mounted on carrier assembly 27. Wheel 12 has an annular rim 157 accommodating a pneumatic tire 151. A circular hub 158 having a central opening 159 as secured to rim 157. Hub 158 is positioned adjacent face plate 86 and held on body 78 with arms 107. Cone head 94 is moved through slots 91-93 into housing 83 by power unit 117 as indicated by the arrow acting on shaft 96. Fins 99, 100 and 101 engage rollers 112 on the inner ends of arms 107 and force the arms outwardly and into holding engagement with rim 157. Springs 113 are compressed so that when tire 12 is lowered into engagement with support 16, power unit 117 can be reversed to move cone head 94 in an outwarde direction whereby springs 113 bias arms 107 inwardly away from rim 157. Tire 12 can then be removed from the carrier assembly 27.

Referring to FIGS. 21 and 22, a wheel 13 is mounted on the carrier assembly 27. Wheel 13 has an annular rim 162 supporting a pneumatic tire 163. The wheel does not have a central hub or disk as it is adapted to be mounted directly on an annular member supported to the drive axel of a tractor. A plurality of struts or arm extensions 164, 165 and 166 as seen in FIG. 21 are mounted on the arms 107. Each extension has outer ends that engage a central portion of wheel rim 162.

Figure 23:
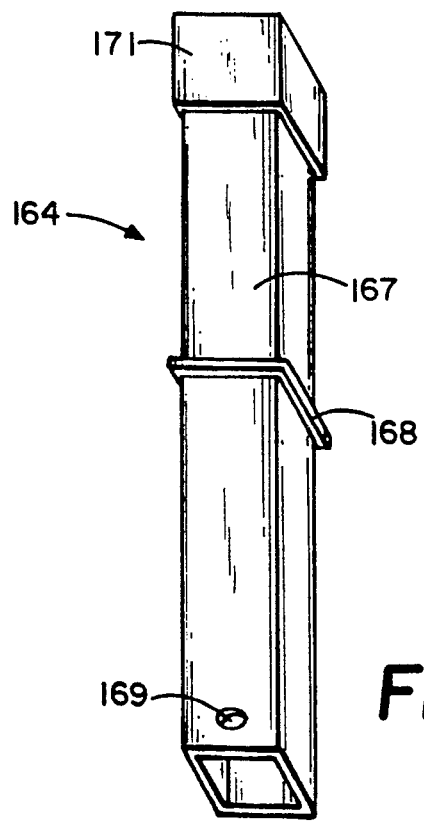
FIG. 23 is a perspective view of an arm extension used with the apparatus as shown in 21.

Referring to FIG. 23, arm extension 164 comprises a generally square strut or tube 167 having a central outwardly directed rim or flange 168. A cap 171 of hard materials such as rubber or plastic fits over the outer end of tube 167. The inner end of tube 167 has a hole 169 for accommodating a pin (not shown) connecting tube 167 to arm 107. As shown in FIG. 22, the inner portion of tube 167 telescopes into arms 107. Rib 168 bears against the outer end of arm 107 whereby the arm extensions 164, 165, and 166 function as rigid struts connecting arms 107 to the inner portion of rim 162.

Power unit 117 is operated in response to the operation of the valve 128 to move the cone head 94 into the body 78. Fins 99, 100, and 101 engage rollers 112 at the inner end of the arms 107 and move arms 107 along with the arm extensions 164, 165, and 166 in an outward direction to firmly engage rim 162.

When wheel 13 has been raised from the support 16 with the winch 38 it can be rotated to a selected angular position and then held in this position by the lock unit 147. Wheel 13 is removed from holder 77 by lowering carrier assembly 27 until wheel 13 engages support 16. Power unit 117 is reversed to move head 94 out of housings 83-85. Springs 113 move arms 107 along with extensions 164 to in or release positions away from wheel rim 162. Wheel 13 is free to be removed from wheel holder 77.

While there has been shown and described the wheel handling apparatus of the invention usable with three different types of wheels, it is understood that changes, additions, and modifications may be made by those skilled in the art without departing from the invention. The invention is defined in the following claims.

We claim:

1. An apparatus for handling a wheel comprising: a support, a generally upright mast, means mounting the mast on the support, a carrier assembly, said carrier assembly including means mounted on the mast for movement along said mast, means connected to the carrier assembly and mast operable to move the carrier assembly relative to the mast, means for holding the carrier assembly in a selected position on said mast, wheel holder means for holding and supporting the wheel, said wheel holder means includes a body and head means, means mounting the body on the carrier assembly for movement with the carrier assembly whereby the wheel carried by the wheel holder means moves with the carrier assembly relative to said mast, power means mounted on the carrier assembly and connected to the wheel holder means for holding and supporting the wheel on the wheel holder means, rod means connecting the head means to the power means whereby the power means operates to move the head means relative to the body to hold and support the wheel on the wheel holder means, said body including housings, arms movably mounted on the housings engagable with the wheel to hold the wheel, said head means including a plurality of fin means having inwardly converging edges engagable with said arms to move said arms outwardly into engagement with the wheel when the power means moves the head means toward the body thereby holding and supporting the wheel on said arms.

2. The apparatus of claim 1 wherein: the mast includes a pair of upright beams, and said means mounting the carrier assembly on the mast having tubular means mounted on said beams for movement along said beams.

3. The apparatus of claim 2 wherein: said tubular means mounted on said beams includes low friction pad means slidably engaging said beams.

4. The apparatus of claim 1 wherein: said means connected to said carrier assembly for moving the carrier assembly comprises a winch mounted on the carrier assembly and a cable connected to the winch, mast, and carrier assembly whereby on operation of the winch the carrier assembly is moved relative to the mast.

5. The apparatus of claim 4 including: a first pulley mounted on a top portion of the mast, a second pulley mounted on the carrier assembly, and a cable anchor mounted on a top portion of the mast, said cable being trained about said first and second pulleys and connected to said anchor.

6. The apparatus of claim 1 wherein: the means for holding the carrier assembly in a selected position on the mast comprises latch means mounted on the carrier assembly and means on the mast cooperating with the latch means to hold the carrier assembly, in selected positions on the mast, said latch means being releasable from the means on the mast to allow the carrier assembly to move relative to the mast.

7. The apparatus of claim 1 wherein: the means mounting the body on the carrier assembly includes sleeve means secured to the body and rotatably mounted on the carrier assembly, and lock means to hold the sleeve means in a selected angular position, said lock means being releasable to allow the body and wheel to be rotated.

8. The apparatus of claim 1 wherein: the arms have inner end portions, rollers mounted on said inner end portions of said arms, said fin means being engagable with said rollers when the head means is moved toward the body.

9. The apparatus of claim 1 including: biasing means engagable with the arms to bias the arms in inwardly directions.

10. The apparatus of claim 1 including: extension means mounted on the arms projected outwardly into engagement with the wheel.

11. The apparatus of claim 10 wherein: the extension means comprise strut members removably mounted on the arms.

12. The apparatus of claim 1 including: means releasably connecting the head means to the rod means whereby the head means can be removed from the rod means.

13. The apparatus of claim 1 wherein: the power means is a double acting piston and cylinder assembly operable in response to fluid under pressure, and control means for supplying fluid under pressure to and allowing fluid to flow from the piston and cylinder assembly.

14. The apparatus of claim 13 wherein: the control means includes valve means and support means for positioning the valve means above the wheel holder means.

15. An apparatus for handling a wheel comprising: a support, a generally upright mast including a pair of upright beams secured to the support, said beams being laterally spaced from each other and generally parallel to each other, a carrier assembly movable along said beams, said carrier assembly including movable members mounted on the beams and movable along said beams and first means connecting the members to each other, second means connected to the carrier assembly and mast operable to move the carrier assembly and members relative to the mast, wheel holder means for holding and supporting the wheel, said wheel holder means includes a body and head means movable relative to the body to hold the wheel on said wheel holder means, third means secured to the first means for supporting the wheel holder means whereby the wheel holder means moves with said carrier assembly relative to said mast, power means mounted on the third means and connected to the head means operable to move the head means to hold and support the wheel on the wheel holder means, said body having housings, and arms movably mounted on the housings engageable with the wheel to hold the wheel, said head means including a plurality of fin means having inwardly converging edges engageable with said arms to move said arms outwardly into engagement with the wheel when the power means moves the head means toward the body thereby hold and support the wheel on said arms.

16. The apparatus of claim 15 wherein: the movable members comprise a pair of tubular members surrounding the beams for movement along said beams.

17. The apparatus of claim 16 including: low friction pad means between the tubular members and the beams to slideably support the tubular members on the beam.

18. The apparatus of claim 15 wherein: said second means comprises a winch mounted on the carrier assembly and a cable connected to the winch, mast and carrier assembly whereby on operation of the winch the carrier assembly and movable members are moved relative to the mast.

19. The apparatus of claim 18 including: a first pulley mounted a top portion of the mast, a second pulley mounted on the carrier assembly, and a cable anchor mounted on a top portion of the mast, said cable being trained about said first and second pulleys and connected to said anchor.

20. The apparatus of claim 15 including: latch means mounted on at least one movable member and engagable with a beam to hold the carrier assembly in a selected position on said mast, said latch means being movable out of engagement with said beam to allow the carrier assembly to move relative to the mast.

21. The apparatus of claim 15 wherein: the third means has a generally horizontal passage, said wheel holder means includes sleeve means extended into said passage whereby said wheel holder means can rotate relative to said carrier assembly, and lock means to hold the sleeve means in a selected angular position, said lock means being releasable to allow the wheel holder means to be rotated.

22. The apparatus of claim 21 wherein: the third means includes a generally horizontal sleeve secured to the first means.

23. The apparatus of claim 15 including: rod means connecting the head means to the power means whereby the power means operates to move the head means relative to the body to hold and support the wheel on the wheel holder means.

24. The apparatus of claim 15 wherein: the arms have inner end portions, rollers mounted on the inner end portions of the arms, said fin means being engageable with said rollers when the head means is moved toward the body.

25. The apparatus of claim 15 including: biasing means engageble with the arms to bias the arms in inward directions.

26. The apparatus of claim 15 including: extension means mounted on the arm means projected outwardly into engagement with the wheel.

27. The apparatus of claim 26 wherein: the extension means comprise strut member removeably mounted on the arms.

28. The apparatus of claim 15 including: means releasably connecting the head means to rod means whereby the head means can be removed from the shaft means.

29. The apparatus of claim 15 wherein: the power means is a double acting piston and cylinder assembly operable in response to fluid under pressure, and control means for supplying the fluid under pressure to and allowing fluid to flow from the piston and cylinder assembly, said piston and cylinder assembly being operatively connected to rod means for moving the head means relative to the body.

30. The apparatus of claim 29 wherein: the control means includes valve means and support means for positioning the valve means above the wheel holder means.

* * * * *